(12) United States Patent
Davidson et al.

(10) Patent No.: US 11,678,761 B2
(45) Date of Patent: Jun. 20, 2023

(54) DEVICE, METHOD AND SYSTEM FOR DISPENSING FAT BASED-EDIBLE CONSUMABLES

(71) Applicant: Nupuk Limited, Wellington (NZ)

(72) Inventors: Gabriel Davidson, Paraparaumu (NZ); Adam Rogan Ben-Dror, Lower Hutt (NZ)

(73) Assignee: Nupuk Limited, Roseneath (NZ)

( * ) Notice: Subject to any disclaimer, the term of this patent is extended or adjusted under 35 U.S.C. 154(b) by 1108 days.

(21) Appl. No.: 16/306,073

(22) PCT Filed: May 31, 2017

(86) PCT No.: PCT/NZ2017/050072
§ 371 (c)(1),
(2) Date: Nov. 30, 2018

(87) PCT Pub. No.: WO2017/209631
PCT Pub. Date: Dec. 7, 2017

(65) Prior Publication Data
US 2020/0329901 A1   Oct. 22, 2020

(30) Foreign Application Priority Data
Jun. 1, 2016 (NZ) .................................. 720732

(51) Int. Cl.
*A47J 31/40* (2006.01)
*A23G 1/00* (2006.01)
(Continued)

(52) U.S. Cl.
CPC ............ *A47J 31/402* (2013.01); *A23G 1/005* (2013.01); *A23G 1/20* (2013.01); *A23G 1/56* (2013.01); *A47J 31/06* (2013.01); *A47J 31/41* (2013.01)

(58) Field of Classification Search
CPC ...... A47J 31/56; A47J 31/3671; A47J 31/469; A47J 31/30; A47J 31/41; A47J 31/467;
(Continued)

(56) References Cited

FOREIGN PATENT DOCUMENTS

| EP | 1580144 | 9/2005 | |
|----|---------|--------|---|
| EP | 1580144 A1 * | 9/2005 | .......... A47J 31/0668 |
| EP | 1767467 | 3/2007 | |

OTHER PUBLICATIONS

International Search Report for International Application No. PCT/NZ2017/050072 dated Sep. 6, 2017 (4 pages).
(Continued)

*Primary Examiner* — Phuong T Nguyen
(74) *Attorney, Agent, or Firm* — Merchant & Gould P.C.

(57) ABSTRACT

The invention relates to a device, method and system for dispensing a fat-based edible consumable, and more particularly relates to a device, method and system for dispensing melted or softened chocolate. The device includes a receptacle having a chamber configured to receive a fat-based edible consumable and adapted to be coupled with a source of heated and pressurised fluid; and a barrier member adapted to separate heated and pressurised fluid supplied by the source from the consumable, wherein the barrier member is configured to transfer heat and pressure from the heated and pressurised fluid; such that when heated and pressurised fluid is delivered to the barrier member at least a portion of the consumable is softened and is urged through an opening.

18 Claims, 10 Drawing Sheets

(51) Int. Cl.
*A23G 1/20* (2006.01)
*A23G 1/56* (2006.01)
*A47J 31/06* (2006.01)
*A47J 31/41* (2006.01)

(58) Field of Classification Search
CPC ...... A47J 31/002; A47J 31/545; A47J 32/402; A47J 31/06
USPC .................. 99/275, 280, 281, 288, 290, 295
See application file for complete search history.

(56) References Cited

OTHER PUBLICATIONS

International Written Opinion for International Application No. PCT/NZ2017/050072 dated Sep. 6, 2017 (4 pages).
PCT International Preliminary Report on Patentability in Application PCT/NZ2017/050072, dated Dec. 13, 2018, 6 pages.

* cited by examiner

DEVICE, METHOD AND SYSTEM FOR DISPENSING FAT BASED-EDIBLE CONSUMABLES

This application is a National Stage Application of PCT/NZ2017/050072, filed 31 May 2017, which claims benefit of Serial No. 720732, filed 1 Jun. 2016 in New Zealand and which applications are incorporated herein by reference. To the extent appropriate, a claim of priority is made to each of the above disclosed applications.

FIELD

The present invention relates to a device, method and system for dispensing a fat-based edible consumable, and more particularly relates to a device, method and system for dispensing melted or softened chocolate.

BACKGROUND

Any discussion of the prior art throughout the specification should in no way be considered as an admission that such prior art is widely known or that it forms part of common general knowledge in the field.

Hot chocolate, also known as hot cocoa and drinking chocolate, is generally understood to be a warmed, chocolate-flavoured beverage.

Hot chocolate may be prepared by melting solid chocolate directly into warmed milk or water. Chocolate is a fat-based edible consumable, and depending on the type of chocolate (e.g. milk, dark, white) it has a melting or softening point at a temperature between room temperature and 100° C. Generally, the greater the fat content of the chocolate the lower the melting temperature. However, this method of melting solid chocolate into a beverage can be time consuming and inconvenient, particularly for busy baristas and other staff in commercial beverage serving establishments such as cafes and restaurants, as it takes time to sufficiently melt and disperse the chocolate in the beverage, and additional unwieldy equipment can be required.

Other common methods of preparing a hot chocolate beverage can involve mixing either a chocolate flavoured powder or chocolate flavoured syrup with warmed milk and/or water. Some powders and syrups may be stored in ready to use capsules. However, such powders and syrups do not always provide the same flavour or other sensory (organoleptic) properties as melted chocolate. Further, these powders and syrups often contain higher levels of sugar and/or lower levels of cocoa butter or liquor compared to solid chocolate, which diminishes the desirable rich chocolate taste in the beverage. Further, powders and syrups may contain other artificial agents not present in solid chocolate, which some consumers may find off-putting.

In an effort to provide a more convenient way to make a hot chocolate beverage from melted chocolate (rather than from powder or syrups), it has been known to melt a quantity of chocolate ahead of time and keep it in a melted condition so that a hot chocolate beverage may be prepared and served more quickly. However, keeping chocolate warmed in this way can be unsanitary and otherwise inconvenient, and transferring the melted chocolate to a cup or other vessel can be messy.

OBJECT OF THE INVENTION

It is an object of the present invention to provide a device, method and system for dispensing a fat-based edible consumable which addresses, overcomes or ameliorates at least one of the abovementioned disadvantages, or at least provides the public with a useful choice.

SUMMARY OF THE INVENTION

Further aspects of the invention, which should be considered in all its novel aspects, will become apparent from the following description.

In one aspect, there is provided an edible consumable dispensing device for dispensing a fat-based edible consumable, including: a receptacle having a chamber configured to receive a fat-based edible consumable, the chamber having internal walls and a first opening and a second opening, wherein the first opening is adapted to be coupled with a source of heated and pressurised fluid, and a barrier member adapted to separate heated and pressurised fluid supplied by the source from the consumable and at least the second opening, wherein the barrier member is configured to transfer heat and pressure from the heated and pressurised fluid; such that when heated and pressurised fluid is delivered to the barrier member via the first opening, at least a portion of the consumable is softened and urged through the second opening.

Preferably, the fat-based consumable is chocolate.

Preferably, the interior of the chamber of the receptacle is generally cylindrical.

Preferably, the receptacle is adapted to be supported by a holder configured to couple to the source of heated and pressurised fluid.

In one embodiment, the barrier member is preferably adapted to form a seal with the internal walls of the chamber to define a lower chamber within the interior of the receptacle in fluid communication with the second opening.

In another embodiment, the barrier member is preferably a rigid member movingly engageable with the interior walls of the receptacle, and wherein supply of the heated and pressurised fluid forces the barrier member to move toward the second opening. In this embodiment, the barrier member preferably includes a flexible member, wherein the heated and pressurised fluid flexes the barrier member toward the second opening during operation. Preferably, the flexible member is elastic.

Preferably, the first opening is adapted to be coupled with a heated and pressurised fluid outlet of an espresso machine.

In a further aspect, there is provided a method for dispensing a fat-based edible consumable, comprising introducing the fat-based edible consumable into a receptacle having a chamber, the chamber having internal walls and a first opening and a second opening; introducing a barrier member to the receptacle so as to sealingly engage with the internal walls of the chamber and define a lower chamber having the consumable and second opening; coupling the first opening to a source of heated and pressurised fluid; and introducing the heated and pressurised fluid to the receptacle through the first opening such that heat and pressure are transferred to the consumable, thereby softening or melting at least a portion of the consumable and urging the consumable through the second opening.

Preferably, the fat-based consumable is chocolate.

Preferably, the receptacle is generally cylindrical.

Preferably, the receptacle is adapted to be supported by a holder which couples the first opening to the source of heated and pressurised fluid.

Preferably, the barrier member is adapted to form a seal with the internal walls of the receptacle to define a lower chamber within the interior of the receptacle in fluid communication with the second opening.

In one embodiment, the barrier member is preferably a rigid member movingly engageable with the interior walls of the receptacle, and wherein the heated and pressurised fluid forces the barrier member to slide toward the second opening.

In a further embodiment, the barrier member preferably includes a flexible member, and wherein the heated and pressurised fluid flexes the barrier member toward the second opening. Preferably, the flexible member is elastic.

Preferably, the source of heated and pressurised fluid is an outlet of an espresso machine.

Preferably, the fluid has a temperature of about 85 to about 95° C.

Preferably, the fluid has a pressure of about 9 bar.

In a further aspect, there is provided a system for dispensing a fat-based consumable, including a source of heated and pressurised fluid; and the device as herein described.

Preferably, the system further comprises a holder for supporting the receptacle, wherein the holder is adapted to couple to the source of heated and pressurised fluid.

Preferably, the source of heated and pressurised fluid is an outlet of an espresso machine.

Preferably, the fluid has a temperature of about 85° C. to about 95° C.

Preferably, the fluid has a pressure of about 9 bar.

In a further aspect, there is provided a fat-based consumable adapted for use with the device, method, or system as herein described.

Preferably, the barrier member comprises an external wrapper of the fat-based consumable.

Preferably, the wrapper comprises a region of predetermined weakness which is configured to rupture during application of pressure from the source of heated and pressurised fluid.

Preferably, the wrapper comprises means for forming a seal with a lower wall of the receptacle chamber such that the region of weakness is in fluid communication with the lower opening, but sealed from the heated and pressurised fluid.

In a further aspect, there is provided a device, method, system or fat-based consumable substantially as herein described with reference to any of the Figures thereof.

BRIEF DESCRIPTION OF THE DRAWINGS

The invention will now be described by example only and with reference to the Figures, in which.

DETAILED DESCRIPTION OF THE INVENTION

Unless the context clearly requires otherwise, throughout the description, the words "comprise", "comprising", and the like, are to be construed in an inclusive sense as opposed to an exclusive or exhaustive sense, that is to say, in the sense of "including, but not limited to".

In one embodiment, there is provided a device for dispensing a fat based edible consumable in the form of melted or softened chocolate.

Figure 1A:
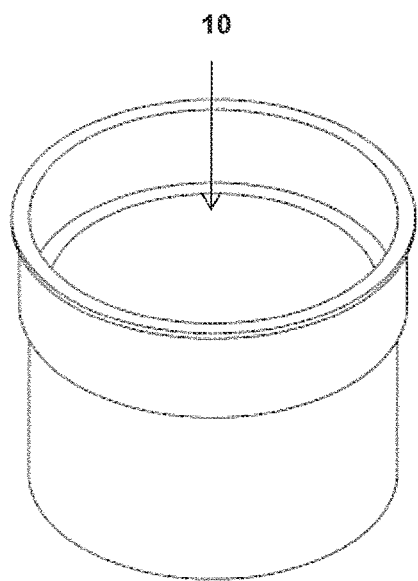
FIGS. 1a and 1b are top and bottom perspective views of a receptacle used with an embodiment of the device, method and system of the present invention.
Figure 1B:
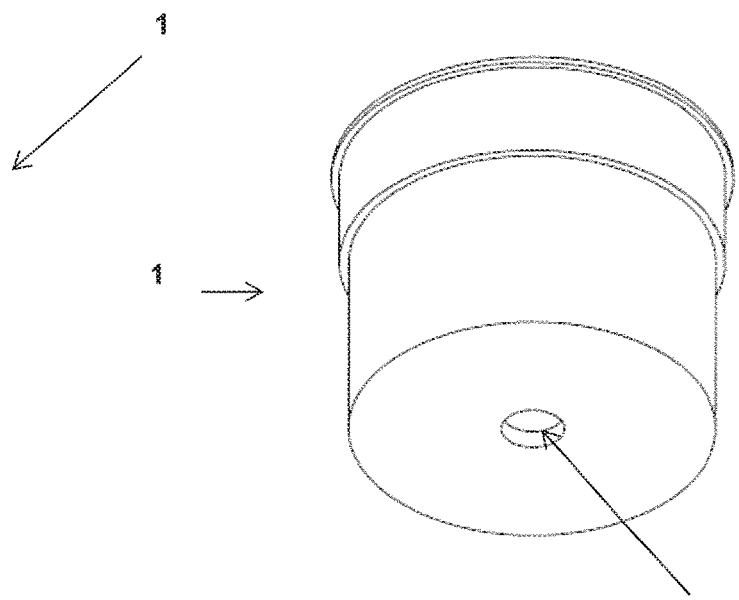
Figure 2:
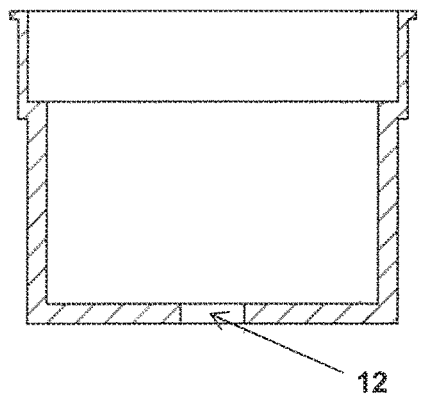
FIG. 2 shows a transverse cross section of the receptacle shown in FIGS. 1a and 1b.
Figure 3:
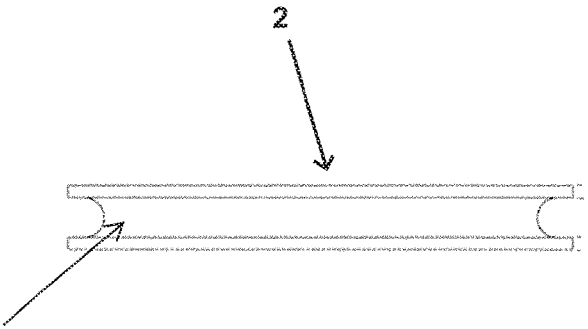
FIG. 3 shows a side view of a barrier member used with an embodiment of the device, method and system of the present invention.
Figure 4:
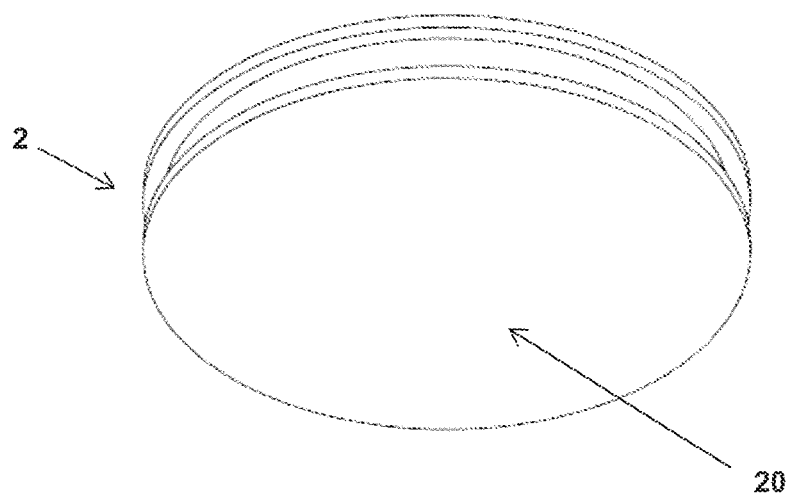
FIG. 4 shows a perspective view of the barrier member shown in FIG. 3.
Figure 5:
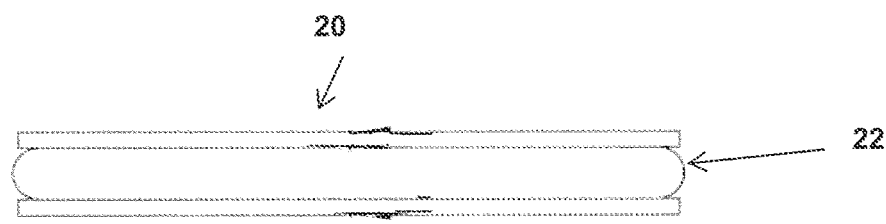
FIG. 5 shows a side view of the barrier member shown in FIGS. 3 and 4 comprising a seal around its perimeter.
Figure 6:
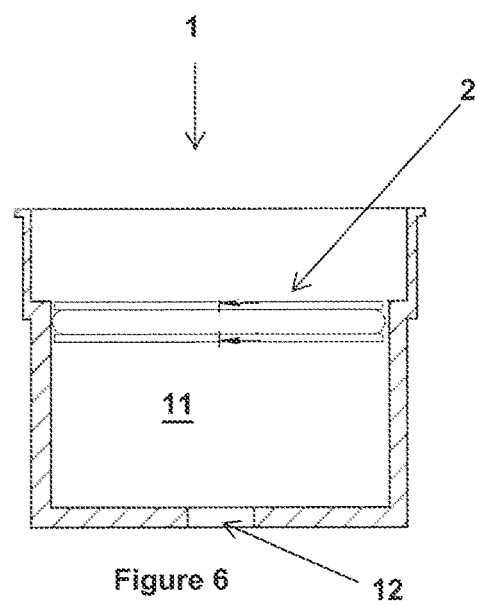
FIG. 6 shows a transverse cross section of the receptacle with the barrier member shown in FIG. 5 engaging with the internal walls of the receptacle.
Figure 7:
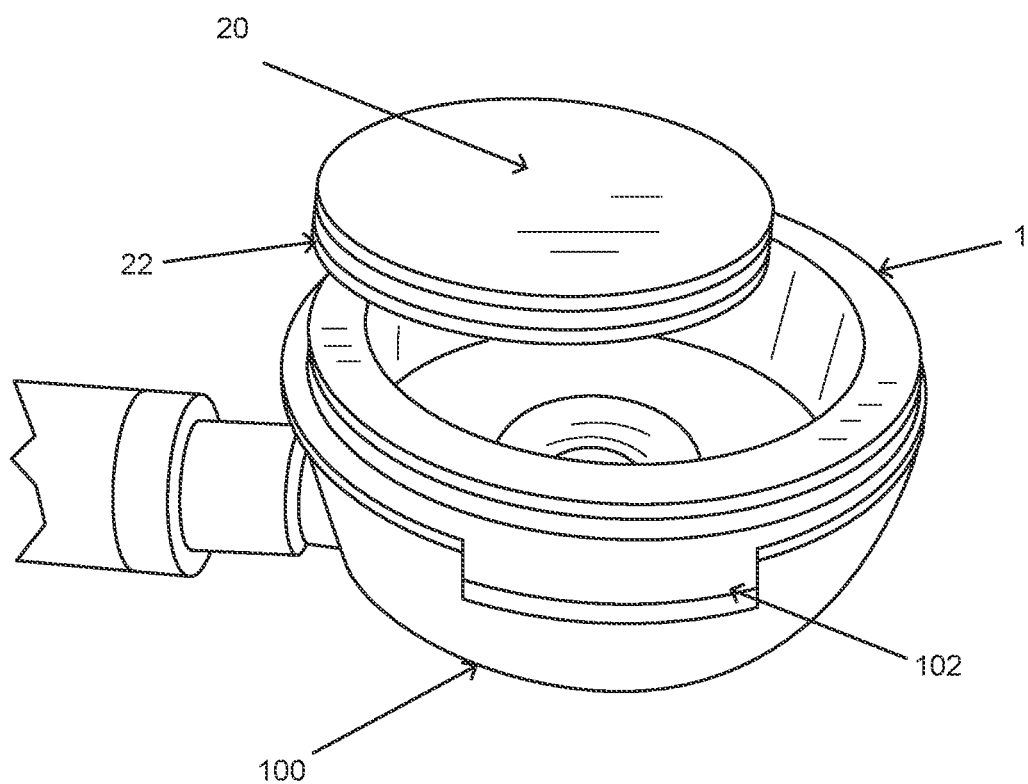
FIG. 7 shows a perspective view of a device in accordance with the invention including a receptacle and a barrier member having a seal around its perimeter.
Figure 8A:
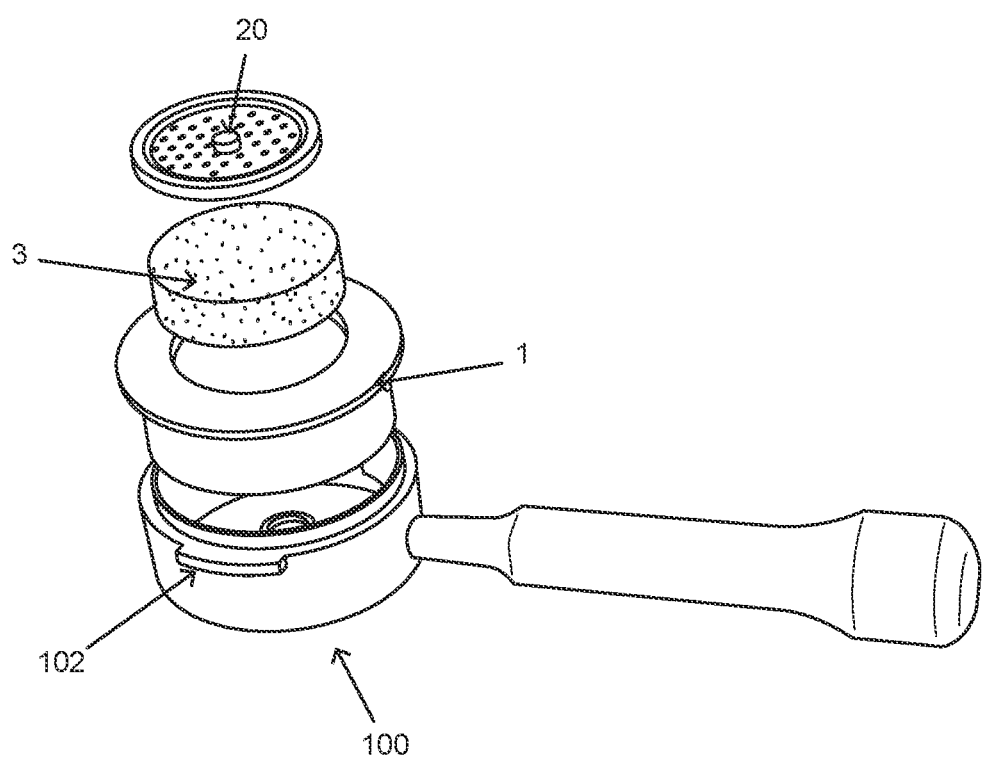
FIGS. 8a to 8e are exploded perspective views, showing the inter-relationship between a holder, a receptacle, a barrier member and an edible consumable, all in accordance with an embodiment of the invention.
Figure 8B:
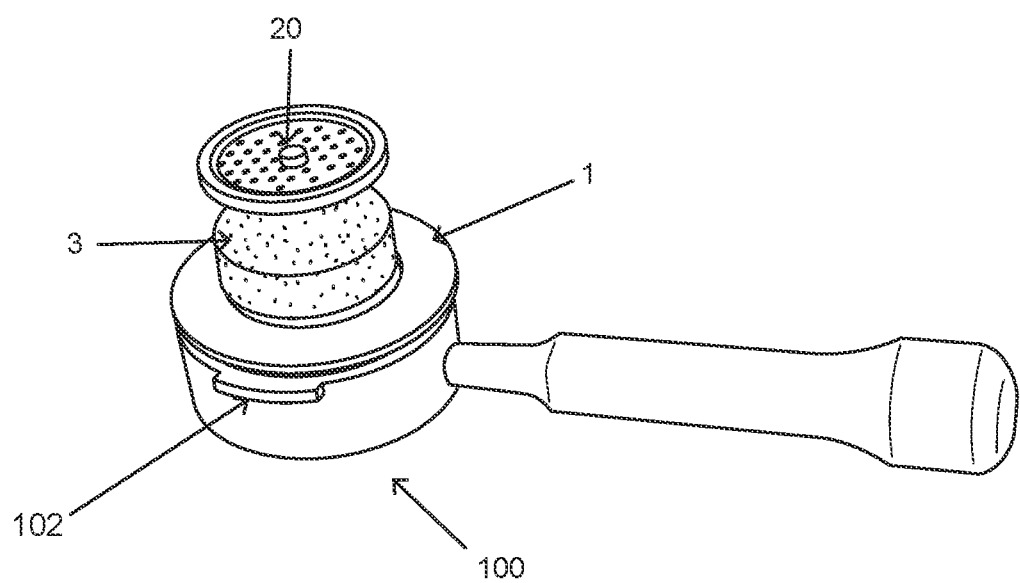
Figure 8C:
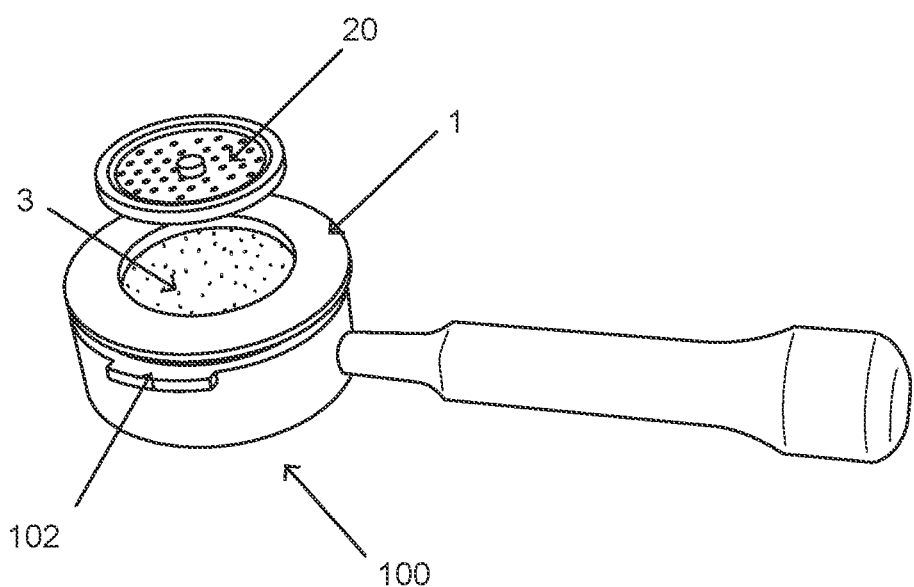
Figure 8D:
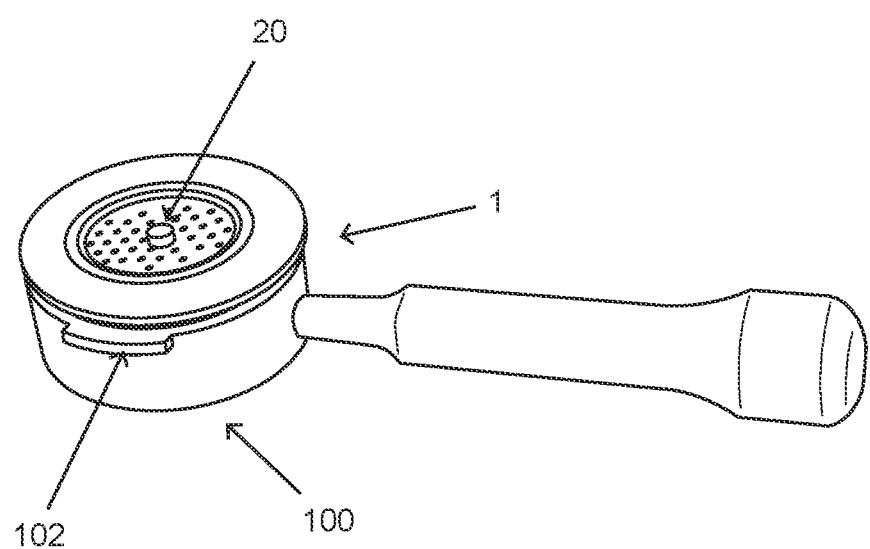
Figure 8E:
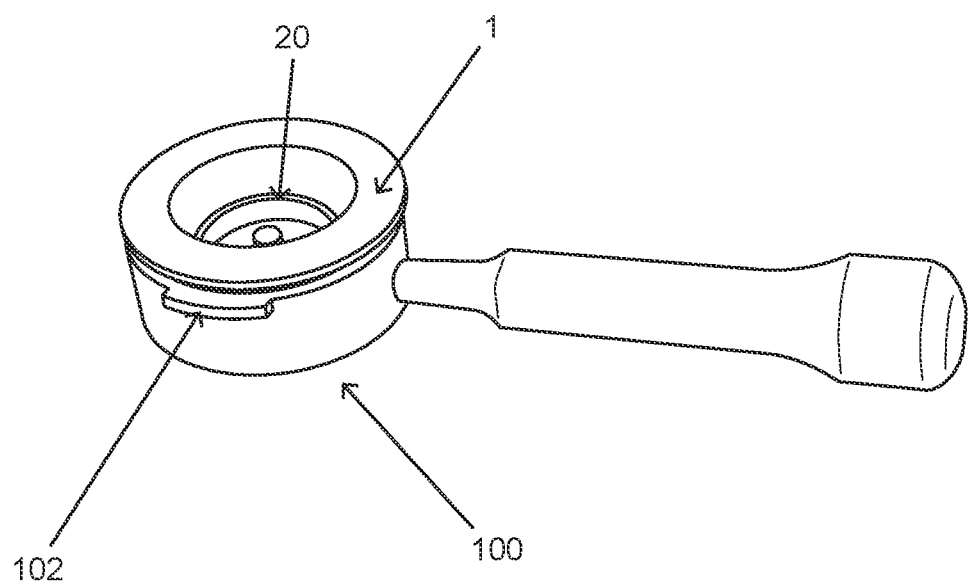

With reference to FIGS. 1a, 1b and 2, a device in accordance with an embodiment of the invention includes a generally cylindrical receptacle 1 having an interior side wall, a first, upper opening 10 adapted to couple in fluid communication with a source of heated and pressurised fluid, such as water, and a second, lower opening 12. In this example the first and second openings are longitudinally spaced apart by the interior side wall. In this embodiment, the receptacle 1 has a lip extending outwardly at or near the upper opening to facilitate handling.

The interior of the receptacle 1 is adapted to receive an initially solid, edible chocolate consumable 3 (shown in FIGS. 8a to 8c, 9a and 9b). The consumable 3 shown in this example is in a cylindrical puck or disc shape, although other suitable shapes are envisaged and will be apparent to the skilled person. The chocolate consumable may sit at or near the bottom of the interior of the receptacle 1, adjacent the lower opening 12. The consumable 3 is adapted to be dispensed from the lower opening 12 as it is softened or melted by the heated and pressurised fluid.

As shown in FIGS. 8a, 8b, 8c, 9a and 9b, the present invention includes a portion of meltable edible consumable 3 such as a fat-based consumable, preferably chocolate. The consumable 3 is preferably a single-serve solid consumable with good shelf life, and is preferably made from high quality chocolate ingredients. The consumable 3 is designed to be melted or softened by the heat conducted into a chamber 11 by the heated and pressurised fluid, and at least partially pressed out through the lower opening 12 by the pressure exerted on the barrier member 2 by the pressurised fluid.

As shown in FIGS. 7 and 8a to 8e, the receptacle 1 is adapted to be supported by a holder 100 suitable for coupling with an espresso type machine.

In espresso machines, heated and pressurised water is ejected from the machine at outlets known as groupheads. The water at the grouphead of a commercial machine has a temperature of about 85° C. to about 95° C. and a pressure of about 9 bar. Ground coffee is added into a filter basket having openings at the bottom through which extracted coffee flows. The filter basket is adapted to sit within a holder which retains the filter basket and has a lower spout and a handle. The holder also has flanges at its upper edge for coupling with the grouphead so as to form a tight fluid communication between the source of the heated and pressurised water and the coffee to be extracted. This holder is often referred to in the art as a "portafilter". When activated, the heated and pressurised water is forced through the coffee, creating a coffee extract, which is pressed through the lower openings of the filter basket, through the bottom of the holder and out of the spout into a cup or other vessel.

In this embodiment, the holder 100 comprises flanges 102 at an upper edge thereof which are adapted to engage with a source of heated and pressurised water (i.e. the grouphead of the espresso machine). However, the receptacle 1 need not be supported by a separate holder 100; and could itself comprise integral coupling means for coupling with a grouphead, for example, by comprising coupling flanges at or near an upper end thereof.

The receptacle 1 may be made from a suitably sterile material able to withstand the temperature and pressure of the heated and pressurised fluid, such as stainless steel. Any other material or combination of materials suitable for handling foodstuffs and withstanding the pressure and temperatures of the heated and pressurised fluid may be used (e.g. brass, ceramic or plastic materials).

A barrier member 2 is included to seal off the consumable 3 and lower opening 12 from direct contact with the heated pressurised water. The barrier member 2 is moveable within the receptacle 1 so as to be able to transfer pressure from the heated and pressurised fluid onto the consumable 3. The barrier member 2 is also conductive to heat, allowing it to transfer heat to the consumable 3 to assist in melting or softening the consumable 3. The combination of heat and pressure on the consumable is most effective to press it through the lower opening 12.

In one embodiment, and with reference to FIGS. 3 to 6, the barrier member 2 includes a rigid disc 20 engageable with the internal walls of the receptacle 1 so as to form a watertight sliding seal with the receptacle walls. The disc thus functions as a plunger, movable within the receptacle between the first and second openings. When engaged with the internal walls, the barrier member forms a chamber 11 in fluid communication with the lower opening 12. The barrier member 2 separates the chamber from the upper opening 10 and prevents the heated and pressurised water from escaping into the chamber 11. In this embodiment, the barrier member 2 includes a seal 22 around its perimeter which engages the internal walls of the receptacle 1 so as to provide a more effective sliding water and pressure tight seal. The seal 22 may be an O-ring type seal made from rubber, silicone or other appropriate material which fits around the perimeter of the barrier member.

In use, and with reference to FIGS. 7 and 8a to 8e, the device may be used in a method to prepare a hot chocolate beverage. The receptacle 1 is fitted in the holder 100, and a puck of chocolate 3 is placed in the interior of the receptacle 1. The barrier member 2 is placed over the puck 3 in the receptacle 1 which seals the internal walls of the receptacle 1 such that the puck is in a chamber in fluid communication with the lower opening 12. The receptacle 1 is coupled with the source of heated and pressurised water via flanges 102 on the holder 100 such that the source is in fluid communication with the upper opening 10. When the source of heated and pressurised water is activated, the fluid is brought into contact with a top side of the disc of the barrier member 20. Some of the heat of the water is conducted through the barrier member 2, which melts or softens the chocolate puck 3. The pressure of the water causes the barrier member 2 to slide along the internal walls of the receptacle 1 and press against the puck 3. When the puck 3 has been sufficiently softened or melted, it is pressed out through the lower opening 12 by the barrier member 2. Once pressed through the lower opening 12, the softened or melted chocolate may be dispensed directly into a container or cup, or be transferred for further processing.

Figure 9A:
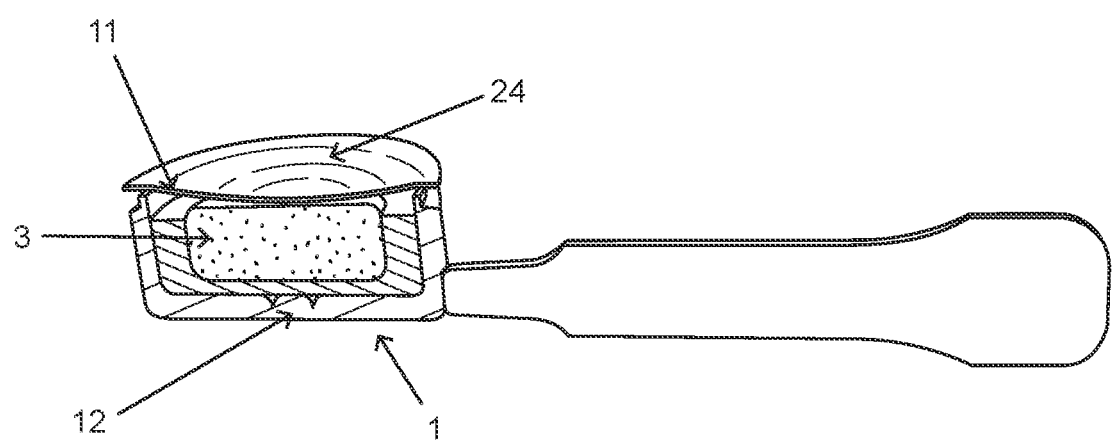
FIGS. 9a and 9b show a transverse cross section of an alternative embodiment of the present invention, wherein the receptacle, containing a chocolate edible consumable, comprises a handle and a flexible/stretchable barrier member.
Figure 9B:
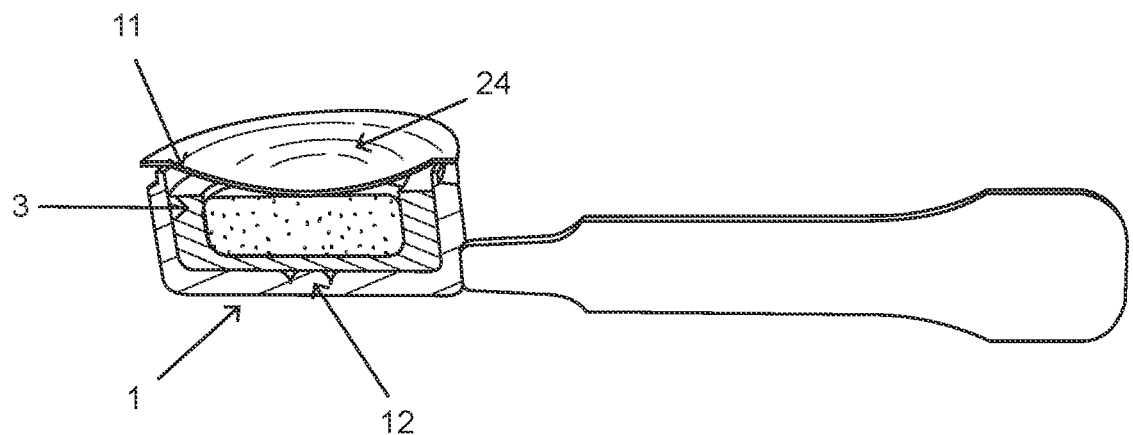

In another embodiment, and with reference to FIGS. 9a and 9b, a barrier member 24 is engageable with the top opening 10 or walls of the receptacle 1 and comprises a flexible/stretchable material (such as silicone or other suitable flexible/stretchable impermeable material so as to define a chamber with a lower opening 12 which is sealed from the top opening 10. The flexible/stretchable material is made from a material which can seal the consumable from the pressurised and heated water. In this embodiment, some heat of the water is conducted through the barrier member 24 so as to melt or soften the chocolate. The pressure of the water causes the barrier member 24 to flex inwardly into the chamber, thereby transferring pressure onto the chocolate puck 3. When the chocolate has been sufficiently softened or melted, it is pressed out through the lower opening 12. The barrier member 24 may be disposable or reusable. Where the barrier member 24 is reusable, the flexible/stretchable material is sufficiently elastic so as to substantially return to its original shape after the consumable 3 has been dispensed from the receptacle 1.

In another embodiment, an edible fat based consumable comprises an external wrapper or casing. The wrapper preferably comprises a point of weakness configured to rupture at a lower force than the rest of the wrapper. The wrapped consumable is adapted to be placed in the receptacle 1 such that the point of weakness of the wrapper is in close proximity with the lower opening of the receptacle. In this embodiment, the wrapped consumable may be used with the device, method and system to dispense the consumable as described above without necessitating removal of the wrapper prior to its use, as the wrapper ruptures upon the heat and pressure of the barrier member.

In another embodiment, the wrapping of the consumable may be adapted to perform the function of the barrier member itself. In this embodiment, the wrapper is adapted to exclude fluid from the consumable, and to transfer heated and pressure from heated and pressurised fluid to the consumable. The wrapper is further adapted to form a seal with a lower part of the receptacle chamber such that the point of weakness of the wrapper is in fluid communication with the lower opening 12, but sealed from the heated and pressurised fluid entering the chamber through the upper opening 10. In use, the wrapped consumable may be placed in the receptacle 1 and coupled with the source of heated and pressurised fluid without the need for an additional barrier layer or plunger.

Dispensing chocolate generally takes from 90 seconds to 30 seconds, depending in part on the type of chocolate used.

The device may be used to dispense consumables other than chocolate, for example, the device may be used to dispense any fat-based consumable which has a melting or softening temperature in a range similar to that of chocolate.

Although this invention has been described by way of example and with reference to possible embodiments thereof, it is to be understood that modifications or improvements may be made thereto without departing from the scope of the invention. The invention may also be said broadly to consist in the parts, elements and features referred to or indicated in the specification of the application, individually or collectively, in any or all combinations of two or more of said parts, elements or features. Furthermore, where reference has been made to specific components or integers of the invention having known equivalents, then such equivalents are herein incorporated as if individually set forth.

What is claimed is:

1. A device for dispensing a fat-based edible consumable, including:
   a receptacle having a chamber configured to receive a fat-based edible consumable, the chamber having internal walls and a first opening and a second opening;
   wherein the first opening is adapted to be coupled with a heated and pressurised fluid source; and
   an impermeable barrier layer comprising a fluid source facing side and an opposing consumable facing side;
   wherein the barrier layer comprises a water-tight seal engaged with the internal walls of the chamber so as to separate the source of heated and pressurised fluid from the consumable and at least the second opening on the consumable facing side;
   wherein the barrier layer is configured to transfer heat and pressure from the heated and pressurised fluid,
   such that when heated and pressurised fluid is delivered to the fluid source-facing side of the impermeable barrier layer via the first opening, at least a portion of the consumable is softened and urged through the second opening.

2. The device of claim 1, wherein the fat-based consumable is chocolate.

3. The device of claim 1, wherein the interior of the chamber of the receptacle is generally cylindrical.

4. The device of claim 1, wherein the receptacle is adapted to be supported by a holder configured to couple to the source of heated and pressurised fluid.

5. The device of claim 1, wherein the barrier layer is adapted to form a seal with the internal walls of the chamber to define a lower chamber within the interior of the receptacle in fluid communication with the second opening.

6. The device of claim 1, wherein the barrier layer is a rigid member movingly engageable with the interior walls of the receptacle, and wherein supply of the heated and pressurised fluid forces the barrier layer to move toward the second opening.

7. The device of claim 1, wherein the barrier layer includes a flexible member, and wherein the heated and pressurised fluid flexes the barrier layer toward the second opening.

8. The device of claim 7, wherein the flexible member is elastic.

9. The device of claim 1, wherein the first opening is adapted to be coupled with a heated and pressurised fluid outlet of an espresso machine.

10. A system for dispensing a fat-based consumable, including a source of heated and pressurised fluid; and the device of claim 1.

11. The system of claim 10, wherein the system further comprises a holder for supporting the receptacle, wherein the holder is adapted to couple to the source of heated and pressurised fluid.

12. The system of claim 10, wherein the source of heated and pressurised fluid is an outlet of an espresso machine.

13. The system of claim 10, wherein the fluid has a temperature of about 85° C. to about 95° C.

14. The system of claim 1, wherein the fluid has a pressure of about 9 bar.

15. A fat-based consumable adapted for use with the device of claim 1.

16. The fat-based consumable of claim 15, wherein the barrier layer comprises an external wrapper of the fat-based consumable.

17. The fat-based consumable of claim 16, wherein the wrapper comprises a region of predetermined weakness which is configured to rupture during application of pressure from the source of heated and pressurised fluid.

18. The fat-based consumable of claim 17, wherein the wrapper comprises means for forming a seal with a lower wall of the receptacle chamber such that the region of weakness is in fluid communication with the lower opening, but sealed from the heated and pressurised fluid.

* * * * *